United States Patent [19]

Winnek

[11] Patent Number: 4,600,297

[45] Date of Patent: Jul. 15, 1986

[54] APPARATUS AND METHOD OF PROJECTION PRINTING OF THREE-DIMENSIONAL PHOTOGRAPHS

[76] Inventor: Douglas F. Winnek, 80 Laurel Dr., Carmel Valley, Calif. 93924

[21] Appl. No.: 500,109

[22] Filed: Jun. 1, 1983

[51] Int. Cl.⁴ .................. G03B 27/32; G03B 35/14
[52] U.S. Cl. ............................... 355/22; 350/130; 352/86; 353/7; 354/112; 354/125; 355/77
[58] Field of Search ............... 352/61, 81, 86; 353/7, 353/38; 354/112, 123, 125; 355/22, 33, 77; 350/130

[56] References Cited

U.S. PATENT DOCUMENTS

| | | | |
|---|---|---|---|
| 2,562,077 | 7/1951 | Winnek | 355/22 |
| 3,409,351 | 11/1968 | Winnek | 352/61 X |
| 3,528,736 | 9/1970 | Jones | 355/22 |
| 3,666,465 | 5/1972 | Winnek | 355/33 |
| 4,059,354 | 11/1977 | Lo et al. | 355/22 |
| 4,092,654 | 5/1978 | Alasia | 355/22 X |
| 4,158,501 | 6/1979 | Smith et al. | 354/112 X |

FOREIGN PATENT DOCUMENTS 3048378 7/1982 Fed. Rep. of Germany ........ 355/22
3048379 7/1982 Fed. Rep. of Germany ........ 355/22

*Primary Examiner*—Richard A. Wintercorn
*Attorney, Agent, or Firm*—Townsend and Townsend

[57] ABSTRACT

Apparatus and method of projecting photographic images from a first film onto a second film. The images on the first film are made in a scan camera and represent a series of aspect views of a subject photographed by the scan camera. The apparatus includes means at a first location for mounting the first film adjacent to a first lattice. Light is directed through the first film and the first lattice as the first film and first lattice are moved one pitch line relative to each other. The light is then directed through a projection lens and a second lattice and onto a second film spaced from the first film as the second lattice and the second film move relative to each other one pitch line. The first and second lattices can comprise Ronchi gratings or can be first and second lenticular screens.

12 Claims, 5 Drawing Figures

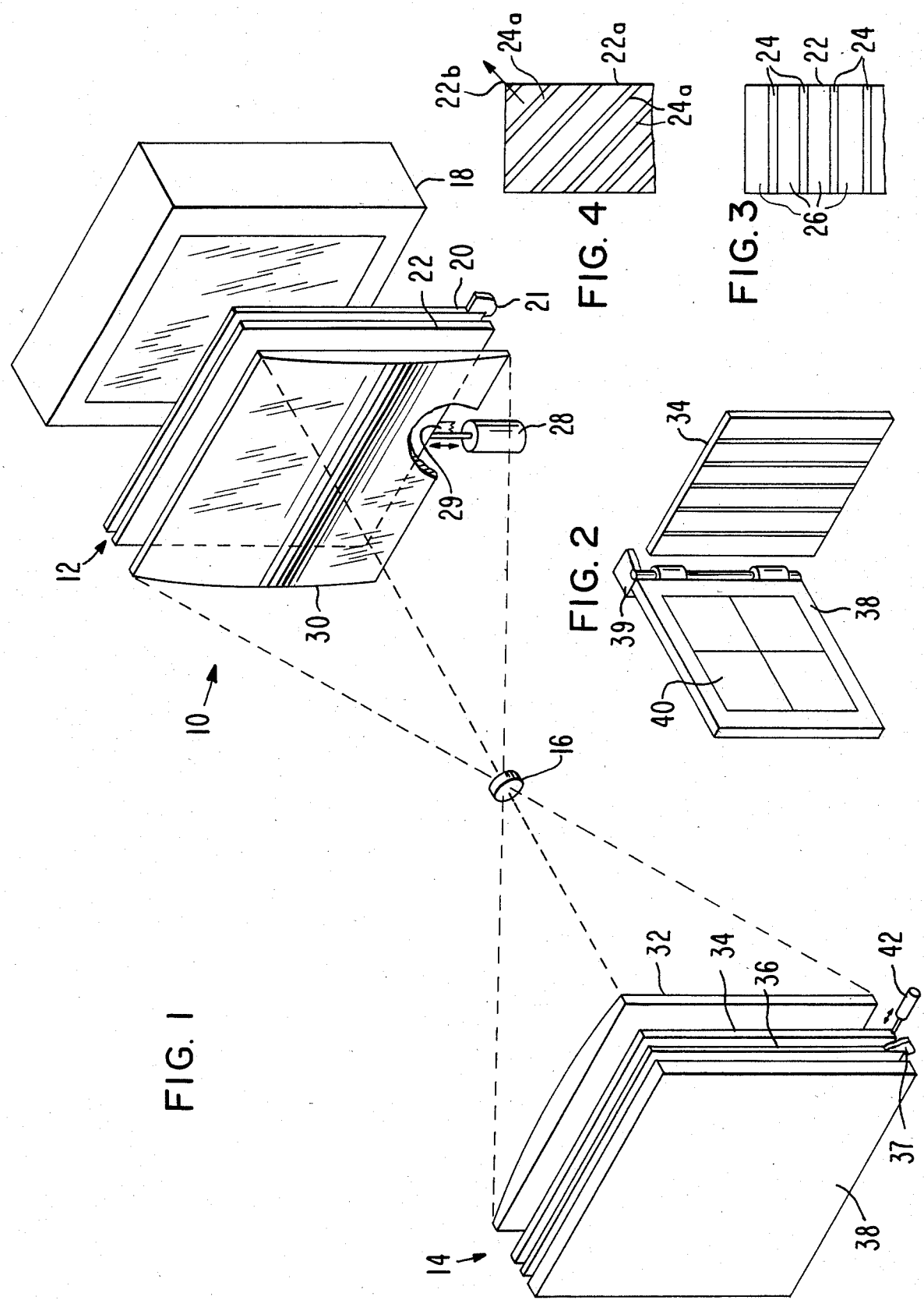

APPARATUS AND METHOD OF PROJECTION PRINTING OF THREE-DIMENSIONAL PHOTOGRAPHS

This invention relates to improvements in the making of three-dimensional photographs and, more particularly, to apparatus and method for making such photographs by projection printing techniques.

BACKGROUND OF THE INVENTION

Three-dimensional negative films are capable of being made by apparatus, such as a straight line scan camera. In such a camera, a Ronchi grating or lenticular screen is used to make a three-dimensional exposure of the film during the period of the scan of the camera. The camera may move in a straight line path perpendicular to the vertical axis of the picture field. During this exposure, the film or the Ronchi grating or lenticular screen is pulled a distance equal to one pitch line of the grating or screen. As a result, a succession of aspect views of the subject seen by the camera during its scan is projected upon the film as the film and grating or screen move relative to each other.

After the film has been processed, prints can be be made from the film. Existing equipment for making three dimensional prints from a processed film of the type described is inadequate, and a need exists for improved projection apparatus and method for accomplishing this purpose. The present invention is directed to satisfying this particular need.

Pertinent disclosures in this field include U.S. Pat. Nos. 3,409,351 and 3,666,465.

SUMMARY OF THE INVENTION

The present invention is directed to apparatus and a method for projection printing in which three-dimensional photographs can be made from a negative film taken from a straight line scan camera. The apparatus of the invention includes a first mounting means for mounting the negative film adjacent to a first lattice which can be a Ronchi grating or a lenticular screen. The first lattice and the first film mounting means are movable relative to each other through a distance of one pitch line of the grating or screen during exposure of the film to a light source. Thus, the successive of aspects views recorded on the negative film are directed through a projection lens to a second location at which a second film mounting means is placed adjacent to a second lattice, such as a Ronchi grating or a lenticular screen. The second film mounting means contain a print film to be exposed by the light rays projected from the first, processed film. The second film mounting means and the second lattice are movable relative to each other through a distance of one pitch line of the grating or screen. Image sizes using the projection lens can vary from a normal reduction of 3 to 1 to an enlargement of up to 5 to 1.

The primary object of the present invention is to provide an improved apparatus and method for projection printing of three-dimensional photographs wherein such photographs can be made quickly and easily, can be of high quality, and can be produced without moirre patterns to be formed during the exposure of the print film.

Other objects of this invention will become apparent as the following specification progresses, reference being had to the accompanying drawings for an illustration of the invention.

In the Drawings:

FIG. 1 is a schematic view of the projection system of the present invention using Ronchi gratings;

FIG. 2 is a schematic, perspective view of one end of the apparatus of FIG. 1 at which the print film is to be placed, showing a Ronchi grating for placement adjacent to a swingable vacuum platen for holding the print film flat by suction;

FIG. 3 is an elevational view of one face of a Ronchi grating adapted to be used in the apparatus, the grating having horizontal lines;

FIG. 4 is a view similar to FIG. 3 but showing a Ronchi grating having lines thereof at an angle of approximately 22.5° to the horizontal.

Figure 5:
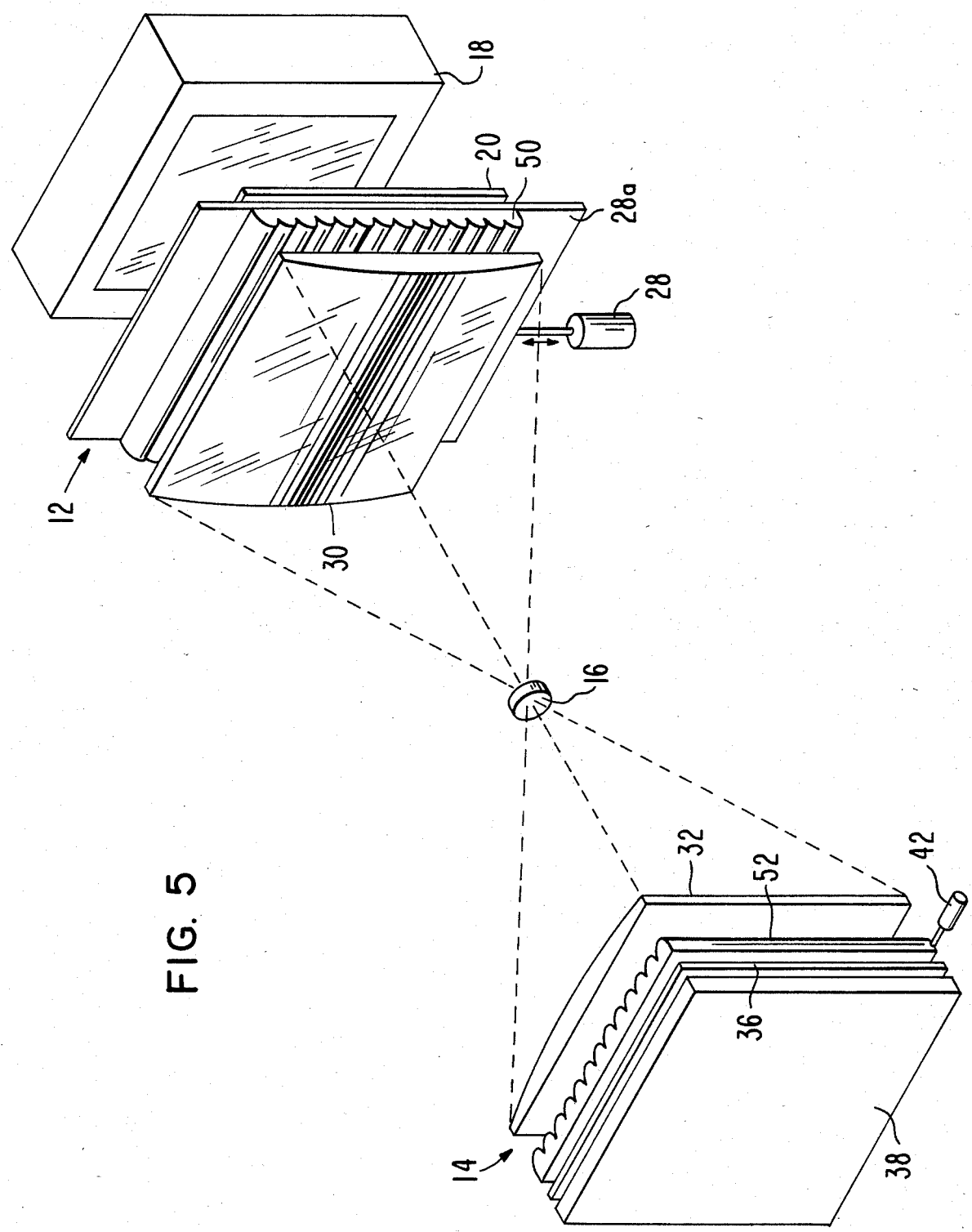
FIG. 5 is a view similar to FIG. 1 but showing the use of lenticular screens with the apparatus in place of the Ronchi gratings.

A projection system for taking three dimensional photographs from a film negative is broadly denoted by the numeral 10 and is shown in FIG. 1. Projection system 10 includes a pair of easels 12 and 14 on opposite sides of a projection lens 16. Adjustment of the distances between the easels and lens 16 provides for focusing to obtain any image size within a normal reduction of 3 to 1 and an enlargement of 4 to 1 or 5 to 1. A Xenon strobe light 18 is adjacent to easel 12 for directing light onto a film negative 20 from which a film print is to be made at easel 14.

Film 20 is made by a straight line scan camera equipped with a motor driven film holder which holds a conventional sheet of photographic film across a stationary Ronchi grating. The grating may be ruled with any desired number of horizontal lines, for example, 40, 50, 60, 80, 100 or even 200 lines per inch. The grating ratio is usually 10 to 1, each black line of the grating being 10 times the width of the clear space between the lines. A typical Ronchi grating is shown in FIG. 3 and denoted by the numeral 22. It has a number of clear spaces 24 through which light can pass. Spaces 24 are separated by black spaces 26. As shown in FIG. 3, the lines 24 are horizontal; however, they can be at an angle of 22.5° as shown in FIG. 4, the grating in FIG. 4 being denoted by the numeral 22a and the clear lines thereof being denoted by the numeral 24a.

In making film 20 in the scan camera, a three dimensional exposure is made during the period of the scan of the camera and the camera slides in a straight line path perpendicular to the vertical axis of the picture field. Usually, the exposure time is from 3 to 10 seconds. During this exposure, the film is pulled one pitch line of the grating and relative to the grating. As a result, a succession of aspect views of the subject seen by the camera during its horizontal scan is projected across the moving film which moves transversely to the camera scan path. The film is exposed and then developed and is then ready to be used in projection system 10.

Mounting the film 20 can be accomplished in any suitable manner. Typically, it is mounted in a fixed position by first film mounting means 21 immediately adjacent to a Ronchi grating 22 with horizontal lines 24 (FIG. 3) and in a position to receive light from strobe light 18. The emulsion side of film 20 is directly adjacent to grating 22.

Film 20 and grating 22 move relative to each other. Either the film can move with respect to the grating or the grating can move with respect to the film. The movement is through a distance of one pitch line of the grating. For purposes of illustration, grating 22 is shown in FIG. 1 as being moveable relative to film 20 under the influence of a reversible motor 28 (FIG. 1) coupled to a holder 29 for the grating so that the grating moves vertically.

Projection system 10 further includes a pair of focusing lenses 30 and 32 on opposite sides of lens 16. Lens 30 is adjacent to grating 22 for receiving light therefrom, and lens 32 is adjacent to easel 14.

Easel 14 includes a second Ronchi grating 34 immediately in front of a print film 36 whose emulsion side faces the grating 34. Second film mounting means 37 mounts film 36. A vacuum platen 38 (FIG. 2) is hingedly mounted for movement on a suitable support 39 for movement of film 36 into and out of a position immediately to the rear of grating 34. Platen 38 has vacuum means 40 for holding film 36 in a flat condition against the rear face of grating 34. The lines of grating 34 are vertical as distinguished from horizontal lines of grating 22 (FIG. 1).

A reversible motor 42 is coupled to grating 34 to move the grating horizontally one pitch line with reference to print film 36. In the alternative, the film could be moved relative to grating 34 to accomplish the same purpose. During the exposure of print film 36, a series of successive aspect views are projected through grating 34 onto print film 36. The print film may or may not be lenticular on the side opposite to the emulsion layer, i.e., on its rear face. Once the print has been processed, it may be viewed in full three dimensional relief when viewed through a parallax grating or lenticular screen of a pitch equal to that of grating 34.

Because Ronchi gratings 22 and 34 have lines which are at 90° to each other, no moirre pattern is produced. The resulting print may be of any size up to the limits of the chosen apparatus. The projection print is free from optical distortion and provides a high quality picture.

In the event that the film negative 20 is formed in the straight line scan camera with a grating similar to grating 22a in FIG. 4, i.e., with the grating lines at an angle of 22.5° to the horizontal, then, grating 22a will be used instead of grating 22 in FIG. 1. Moreover, the drive means coupled to the grating for moving it relative to film negative 20 will move the grating in a direction perpendicular to the lines of the grating. Thus, motor 28 will be replaced by another drive motor which will move the grating 22 in the direction of arrow 22b (FIG. 4). This will provide a high quality image of the continuum of aspect views on film 34 when the images of the aspect views from negative film 20 are projected onto print film 36.

FIG. 5 shows that, instead of using Ronchi gratings at easels 12 and 14, lenticular screens can be used at these locations. As shown in FIG. 5, a first lenticular screen 50 is adjacent to a negative film 20 and has a flat front face contiguous to or substantially near the emulsion side of film 20. Motor 28 is coupled to a plate 28a for pulling lenticular screen 50 one pitch line relative to film 20. In the alternative, film 20 could be moved one pitch line relative to screen 50.

At easel 14, a lenticular screen 52 is placed immediately forwardly of print film 36 with the ridges of screen 52 facing projection lens 16 and being remote from the emulsion side of film 36.

Motor 42 (FIG. 2) is coupled to screen 52 to move the same horizontally one pitch line relative to print film 36. In the alternative, the print film could be moved one pitch line relative to lenticular screen 52 to accomplish the same purpose.

In use, when light 18 is energized, a series of successive aspect views of the images on film 20 is projected through screens 50 and 52 and onto print film 36 as screen 50 moves vertically and screen 52 moves horizontally. Thus, the projection print is free from optical distortion and provides a high quality picture.

What is claimed is:

1. A projection system for making three dimensional photographs comprising: means at a first location for mounting a first film having images representing a succession of aspect views of a subject thereon, said images adapted to be printed on a print film; second means at a second location on the opposite side of said projection lens for mounting a second film adapted to receive images projected from the first film; a projection lens between the first and second locations and in optical alignment with the first mounting means and the second mounting means; first lattice means adjacent to the first film mounting means for causing the light images to be projected from the first film at the first location corresponding to the series of aspect views of the images on the first film; first drive means for moving the first lattice means and the first film mounting means relative to each other through a distance of one pitch line of the lattice means; a second lattice means between the projection lens and the second film mounting means for dividing the images projected through said projection lens into a succession of aspect views to be directed onto the second film at the second mounting means; and second drive means at the second location for moving the second lattice means and the second film mounting means relative to each other.

2. Apparatus as set forth in claim 1, wherein the first lattice means comprises a first Ronchi grating and the second lattice means comprises a second Ronchi grating.

3. Apparatus as set forth in claim 2, wherein the pitch lines of the first Ronchi grating are arranged perpendicular to the pitch lines of the second Ronchi grating.

4. An apparatus as set forth in claim 2, wherein the pitch lines of the first Ronchi grating are generally horizontal, the pitch lines of the second Ronchi grating being substantially vertical.

5. Apparatus as set forth in claim 2, wherein the pitch lines of the first Ronchi grating are approximately 22.5° to the horizontal, the pitch lines of the second Ronchi grating being substantially vertical.

6. Apparatus as set forth in claim 1, wherein the first lattice means comprises a lenticular screen, the second lattice means comprising a second lenticular screen.

7. An apparatus as set forth in claim 6, wherein the ridges of the first lenticular screen are generally horizontal and the ridges of the second lenticular screen are generally vertical.

8. Apparatus as set forth in claim 6, wherein the ridges of the first lenticular screen are remote from the first film mounting means, the ridges of the second lenticular screen being remote from the second film mounting means.

9. Apparatus as set forth in claim 1, wherein said first drive means includes a first drive motor coupled to the first lattice means for moving the same relative to the first film mounting means, the second drive means including a second drive motor coupled to the second lattice means for moving the same relative to the second film mounting means.

10. A method of projection printing of three dimensional photographs: mounting a first film negative at a first location spaced from a second location; with the first film having images representing a succession of aspect views of a subject; mounting a second film at a second location, said second film adapted to be exposed by light projected from said first location; directing light through the first film and to the second film; shifting the first film relative to a first lattice at the first location to form a series of images representing the aspect views recorded on the first film; directing the series of images through a second lattice and onto the second film; moving the second lattice and the second film relative to each other as the images are directed onto the second film to thereby expose the second film with the images.

11. A method as set forth in claim 10, wherein the first lattice comprises a first Ronchi grating and the second lattice means comprises a second Ronchi grating.

12. A method as set forth in claim 10, wherein the first lattice comprises a first lenticular screen and the second lattice means comprises a second lenticular screen.

* * * * *